United States Patent
Yang

(10) Patent No.: US 9,429,675 B2
(45) Date of Patent: Aug. 30, 2016

(54) ANISOTROPY PROCESSING IN LOW ANGLE WELLS

(71) Applicant: Schlumberger Technology Corporation, Sugar Land, TX (US)

(72) Inventor: Jian Yang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 611 days.

(21) Appl. No.: 13/794,568

(22) Filed: Mar. 11, 2013

(65) Prior Publication Data

US 2013/0261975 A1 Oct. 3, 2013

Related U.S. Application Data

(60) Provisional application No. 61/616,035, filed on Mar. 27, 2012.

(51) Int. Cl.
*G01V 3/30* (2006.01)
*G01V 3/28* (2006.01)

(52) U.S. Cl.
CPC .. *G01V 3/30* (2013.01); *G01V 3/28* (2013.01)

(58) Field of Classification Search
CPC .................................. G01V 3/28; G01V 3/30
USPC .......................................................... 702/10
See application file for complete search history.

(56) References Cited

U.S. PATENT DOCUMENTS

| 5,508,616 | A | * | 4/1996 | Sato | G01V 3/28 324/343 |
| 6,163,155 | A | * | 12/2000 | Bittar | G01V 3/28 324/338 |
| 6,181,138 | B1 | * | 1/2001 | Hagiwara | E21B 47/02216 175/50 |
| 6,297,639 | B1 | * | 10/2001 | Clark | G01V 3/30 324/338 |
| 6,351,127 | B1 | * | 2/2002 | Rosthal | G01V 3/28 324/338 |
| 6,476,609 | B1 | * | 11/2002 | Bittar | G01V 3/30 175/45 |
| 6,969,994 | B2 | * | 11/2005 | Minerbo | G01V 3/28 324/338 |
| 6,998,844 | B2 | | 2/2006 | Omeragic et al. | |
| 7,202,670 | B2 | * | 4/2007 | Omeragic | G01V 3/28 324/338 |
| 8,754,650 | B2 | * | 6/2014 | Legendre | G01V 3/18 324/323 |

(Continued)

FOREIGN PATENT DOCUMENTS

EP 2320251 A2 5/2011
WO 2011091216 A2 7/2011

OTHER PUBLICATIONS

International Search Report and Written Opinion for International Application No. PCT/US2013/034012 dated Jul. 15, 2013.

(Continued)

*Primary Examiner* — Bryan Bui
(74) *Attorney, Agent, or Firm* — John Vereb

(57) ABSTRACT

A method for logging subsurface formations penetrated by a wellbore include measuring electromagnetic properties of the formations using electromagnetic fields having a magnetic dipole axis parallel to a logging tool axis Electromagnetic properties of the formations are also measured using electromagnetic fields having a magnetic dipole axis oblique to the logging tool axis. A horizontal resistivity of the formations is determined from the parallel dipole axis measurements. A vertical resistivity, formation layer boundaries and a dip angle of the formations are determined from the oblique dipole axis measurements.

19 Claims, 5 Drawing Sheets

(56) References Cited

U.S. PATENT DOCUMENTS

| | | | |
|---|---|---|---|
| 9,057,797 B2* | 6/2015 | Omeragic | G01V 3/28 |
| 9,134,449 B2* | 9/2015 | Seydoux | G01V 3/22 |
| 2003/0200029 A1* | 10/2003 | Omeragic | G01V 3/30 |
| | | | 702/6 |
| 2004/0046561 A1 | 3/2004 | Itskovich et al. | |
| 2005/0088181 A1 | 4/2005 | Barber et al. | |
| 2007/0236221 A1* | 10/2007 | Merchant | E21B 47/022 |
| | | | 324/339 |
| 2009/0015261 A1* | 1/2009 | Yang | G01V 3/28 |
| | | | 324/343 |
| 2009/0018775 A1* | 1/2009 | Tabarovsky | G01V 3/28 |
| | | | 702/9 |
| 2010/0123462 A1* | 5/2010 | Bittar | G01V 3/28 |
| | | | 324/369 |
| 2010/0277176 A1* | 11/2010 | Homan | E21B 47/102 |
| | | | 324/333 |
| 2011/0199088 A1 | 8/2011 | Bittar | |
| 2011/0231098 A1* | 9/2011 | Omeragic | G01V 3/20 |
| | | | 702/7 |
| 2011/0291855 A1* | 12/2011 | Homan | G01V 3/30 |
| | | | 340/853.2 |
| 2014/0257703 A1* | 9/2014 | Wu | G01V 3/28 |
| | | | 702/7 |
| 2015/0160367 A1* | 6/2015 | Le | E21B 49/00 |
| | | | 324/339 |

OTHER PUBLICATIONS

EP Communication pursuant to Article 94(3) EPC for EP Application No. 13768460.1 dated Oct. 6, 2015.
EP Search Report for EP Application No. 13768460.1 dated Sep. 23, 2015.

* cited by examiner

ANISOTROPY PROCESSING IN LOW ANGLE WELLS

CROSS REFERENCE TO RELATED APPLICATIONS

This application claims priority to and the benefit of a related U.S. Provisional Application No. 61/616,035, filed on Mar. 27, 2012, entitled "ANISOTROPY PROCESSING IN LOW ANGLE WELLS," the disclosure of which is incorporated herein by reference in its entirety.

BACKGROUND

The present disclosure relates in general to the field of well logging, and more particularly, to techniques using one or more tilted electromagnetic transmitter-receiver pairs for improved electromagnetic measurements of subsurface formations.

Various well logging techniques are known in the field of hydrocarbon exploration and production. These techniques typically use tools equipped with sources adapted to emit energy into a subsurface formation that has been penetrated by a borehole. The emitted energy may interact with the surrounding formation to produce signals that may be detected and measured by one or more sensors. Based on the detected signal data, a profile of the formation properties (for example, resistivity as a function of wellbore depth) may be obtained.

Examples of well logging tools may include electromagnetic ("EM") resistivity tools, such as induction and propagation tools. The EM resistivity tools may be disposed within a borehole to measure the electrical conductivity (or its inverse, resistivity) of the formation surrounding the borehole. A conventional electromagnetic resistivity tool includes at least one transmitter and two receivers, each receiver being disposed some distance away from the transmitter along the axis of the tool. Conventional transmitters and receivers include antennas formed of coils having one or more turns of insulated conductive wire wound around a support. As is understood in the art, under the principle of reciprocity, each of those antennas can operate as a transmitter and/or a receiver.

EM induction tools measure the resistivity of the formation by measuring the voltage induced in a receiver by currents flowing in the formation in response to an EM signal emitted by a transmitter. In an induction tool, a transmitter coupled to an alternating current source, such as an oscillator, produces a time-varying EM signal. The EM signal from the transmitter is transmitted into the surrounding formation, which induces a fluctuating current or "eddy current" in the formation near the transmitter. The eddy current in the formation gives rise to a time-varying EM signal that induces an electrical voltage in the receiver. If a pair of spaced-apart receivers is used, the induced voltages in the two receivers will generally have different phases and amplitudes due to, for example, geometric spreading and absorption by the surrounding formation. EM propagation tools operate in a similar fashion, but typically at higher frequencies than EM induction tools.

In many conventional EM induction and propagation logging tools, the transmitter and receiver antennas are mounted with their axes along the longitudinal axis of the tool. Thus, these tools are implemented with antennas having longitudinal or axial magnetic dipole moments. A "transverse" antenna or coil has a magnetic dipole moment that is perpendicular to the tool axis, and a "tilted" antenna has a magnetic dipole moment that is neither parallel with nor perpendicular to the tool axis.

Because the EM signals transmitted and received by an EM resistivity tool pass through the surrounding formation, measurements made by such tools can provide information regarding the electromagnetic properties of the media through which the signals pass. Information such as distance to bed boundaries, formation dip, and anisotropy may be extracted from the received signals.

In the drilling industry there is an ever-increasing need for accurate well placement. Optimal placement of the borehole in the reservoir requires directional measurements on which steering decisions can be based. A further need in hydrocarbon exploration is to identify and characterize hydrocarbon reserves. For example, the formation anisotropy can be used to identify low resistivity pay residing in thinly laminated formations.

Many recent patents disclose methods and apparatus to make directional measurements and obtain resistivity anisotropy. For logging while drilling applications, U.S. Pat. No. 5,508,616 to Sato et al. discloses an induction-type tool with two coils tilted at different directions not aligned with the tool's longitudinal axis. The tool could be adapted for possible geosteering applications. The directionality of the measurement is illustrated through a simple argument that the sensitivity function of the two tilted coils is concentrated towards the overlapping region of the sensitivity area of each coil. Through rotation of the tool, Sato et al. claims that a deep azimuthal resistivity image of the formation can be obtained to help make steering decisions. However, this patent does not provide any details as to how the azimuthal resistivity can be obtained, nor does it describe any further boundary detection/characterization techniques required for quantitative geosteering decision-making.

U.S. Pat. No. 6,181,138 to Hagiwara et al. extends Sato et al.'s single fixed directional coils into co-located triple orthogonal induction coils at the transmitter and receiver locations. No tool rotation is said to be required, since the focusing direction can be tuned to arbitrary orientation through linear combination of the orthogonal coil responses.

U.S. Pat. No. 6,297,639 to Clark et al., which is commonly owned by the assignee of the present disclosure, discloses a method and apparatus for making directional measurements using various shield designs to provide selected attenuation of EM wave energy for axial, tilted, and transverse antenna coils. This patent describes, among other things, general directional induction and propagation measurements with tilted coils and appropriate shields, along with a process for conducting borehole compensation. A combination of one transmitter and one receiver coil with at least one of them being tilted with respect to the tool axis is explicitly described by Clark et al., along with its application for bed boundary direction detection by observing azimuthal variation of the induced signal as the tool rotates. The azimuthal variation of the coupling can be used for steering wells while drilling. Other shield patents have since been granted, including U.S. Pat. No. 6,351,127 to Rosthal et al., and U.S. Pat. No. 6,566,881 to Omeragic et al., both of which are commonly owned by the assignee of the present disclosure.

U.S. Pat. No. 6,476,609 to Bittar extends an earlier anisotropy patent (U.S. Pat. No. 6,163,155, also to Bittar) to the area of geosteering application. The bedding response of up/down tilted induction and propagation apparatus is described through the difference or ratio of signals at two different orientations, but no shielding is mentioned. Nor are the effects of anisotropy or dipping considered. Also lacking in the '609 patent is a description of how to use these measurements to derive a precise distance to a formation bed boundary. The '609 patent implicitly assumes that bedding orientation is precisely known so as to calculate the up/down response. No technique, however, is disclosed to locate the precise up or down direction prior to the calculation of the up-down directional signals.

U.S. Pat. No. 6,969,994 to Minerbo et al., which is also commonly owned by the assignee of the present disclosure, discloses tool configurations and symmetrization techniques that simplify the responses of the directional measurements to the point that they become almost independent of anisotropy or dip angle. Responses to bed boundaries having different dip and anisotropy essentially overlap except near the bed boundary. Both two-coil (one transmitter and one receiver: "TR") induction style and three-coil (one transmitter and two receivers: "TRR") propagation-style measurements can be symmetrized to achieve this simplification. The symmetrization is done using two tilted TR pairs of the same spacing, but with the transmitter tilt angle and receiver tilt angle exchanged.

U.S. Pat. No. 6,998,844 to Omeragic et al., also assigned to the assignee of the present disclosure, discloses propagation-style directional measurements for anisotropy determination in near-vertical wells with borehole compensation. Inversion techniques are also used to obtain the anisotropic formation property.

Further, commonly assigned U.S. Pat. No. 7,202,670 to Omeragic et al. discloses a method of extracting and analyzing the azimuthal dependence of directional logging measurements, using measurements taken at all azimuthal angles, to characterize the earth formation and for steering bottomhole drilling assemblies with improved accuracy. It teaches how to determine the bedding azimuth from the directional measurements, and generating measurements that can be used for well placement in up/down or azimuthal steering. It further teaches ways of utilizing these directional measurements in real-time to obtain bed boundary distances and to obtain accurate earth models such that geosteering decisions can be made for well placement. It also discloses a method of detecting the presence of resistivity anisotropy in formation layers adjacent near-vertical wells. In addition, it teaches a method to obtain structure dip information from directional measurements in vertical and low angle wells.

As described above, EM induction tools measure the resistivity of the formation by measuring the voltage induced in a receiver by currents flowing in the formation in response to an EM signal emitted by a transmitter. In general, the induced voltage in a receiver is a linear combination of all the electromagnetic coupling components, Vij (i,j=x,y,z), forming a 3×3 EM coupling tensor. In a planar geometry formation in which all the relevant bedding boundaries are parallel, there are only five non-zero elements in the 3×3 EM coupling matrix, referred to as Vxx, Vyy, Vzz, Vxz, and Vzx. The coordinate system is chosen such that the z-axis is along the tool axis and the y-axis is parallel to the boundary plane. Since those EM coupling components measure the characteristics of the formation, it is desirable to have an apparatus and method to determine them.

Certain difficulties may be experienced by using conventional propagation resistivity tools, where the magnetic dipole moments of transmitters and receivers are oriented essentially parallel to the tool axis. One is that the measurements are sensitive to or affected by the anisotropy when the relative dip angle is greater than 45 degrees. This can be understood easily in an extreme case of a vertical well, because in a vertical well, the induced current is generally parallel to the horizontal plane and, therefore, the response does not carry any information about the vertical resistivity assuming the formation layers are also parallel to the horizontal plane. Another difficulty is that the vertical resistivity and the relative dip angle are coupled. Therefore even in the relative high dip angle, simultaneous determination of horizontal resistivity (Rh), vertical resistivity (Rv), and the relative dip angle (θ) may not be possible for homogeneous formations. Additionally, environmental effects can break the coupling between Rh and θ.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method, according to one aspect for logging subsurface formations penetrated by a wellbore, includes measuring electromagnetic properties of the formations using electromagnetic fields having a magnetic dipole moment axis parallel to a logging tool axis. Electromagnetic properties of the formations are measured using electromagnetic fields having a magnetic dipole axis oblique to the logging tool axis. A horizontal resistivity of the formations is determined from the parallel dipole axis measurements. A vertical resistivity, formation layer boundaries and a dip angle of the formations are determined from the parallel and oblique dipole axis measurements.

Other aspects and advantages of the present disclosure will be apparent from the following description and claims.

BRIEF DESCRIPTION OF THE DRAWINGS

Certain embodiments are described below with reference to the following figures.

DETAILED DESCRIPTION

The present description is made with reference to the accompanying drawings, in which example embodiments are shown. However, many different embodiments may be used, and thus the description should not be construed as being limited to the embodiments set forth herein. Rather, these embodiments are provided so that this disclosure will be thorough and complete. Generally, like numbers refer to like elements throughout the present description.

In accordance with embodiments described herein, the present disclosure provides example processing methods to determine values of Rh, Rv, and θ (e.g., horizontal resistivity, vertical resistivity, and dip angle). Certain embodiments will be described below, including in the following FIGS. 1-5, which depict representative or illustrative embodiments of the disclosure.

Figure 1:
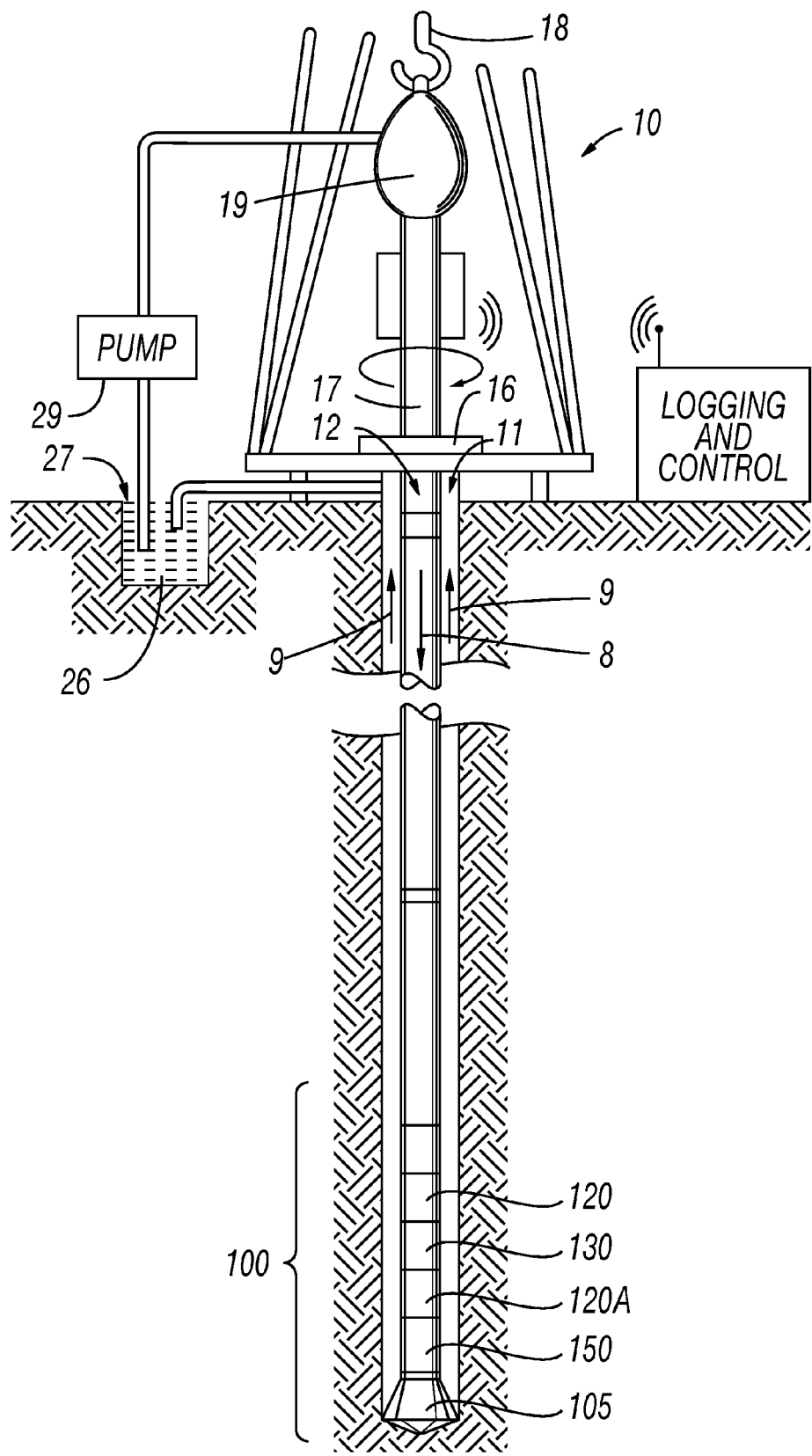
FIG. 1 illustrates an example wellsite system in which the present disclosure can be used, according to an example embodiment.

FIG. 1 illustrates a wellsite system in which the present disclosure can be employed, according to an example embodiment. The wellsite can be onshore or offshore. In this exemplary system, a borehole 11 is formed in subsurface formations 106 by rotary drilling in a manner that is well known. Embodiments of the disclosure can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a travelling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole 11, as indicated by the directional arrows 9. In this well known manner, the drilling fluid lubricates the drill bit 105 and carries formation 106 cuttings up to the surface as it is returned to the pit 27 for recirculation.

In various embodiments, the systems and methods disclosed herein can be used with any means of conveyance known to those of ordinary skill in the art. For example, the systems and methods disclosed herein can be used with tools or other electronics conveyed by wireline, slickline, drill pipe conveyance, coiled tubing drilling, and/or a while-drilling conveyance interface. For the purpose of an example only, FIG. 1 depicts a while-drilling interface. However, systems and methods disclosed herein could apply equally to wireline or any other suitable conveyance means. The bottom hole assembly 100 of the illustrated embodiment includes a logging-while-drilling (LWD) module 120, a measuring-while-drilling (MWD) module 130, a rotary steerable directional drilling system and motor 150, and drill bit 105.

The LWD module 120 is housed in a special type of drill collar, as is known in the art, and can contain one or a plurality of known types of logging tools (e.g., logging tool 121). It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes an electromagnetic resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
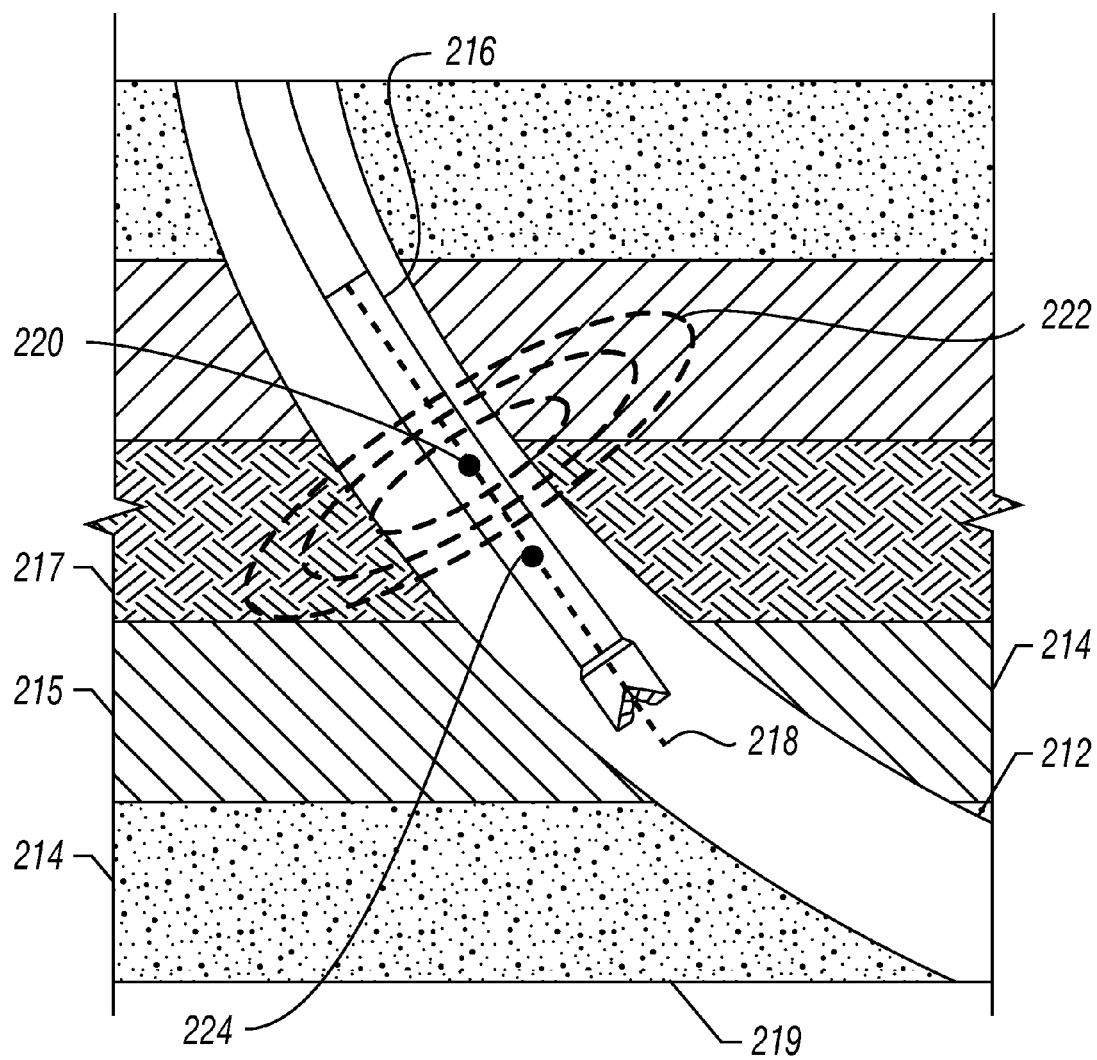
FIG. 2 is schematic drawing of a logging operation to obtain parameters of the subsurface strata, according to an example embodiment.

FIG. 2 is schematic drawing of a logging operation to obtain parameters of the subsurface strata, according to an example embodiment. A borehole or wellbore 212 is drilled penetrating subsurface strata 214, typically at an angle other than perpendicular to the strata 214. A particular stratum 215 may have an upper and lower boundary. The layer 217 just above the particular stratum 215 is generally referred to as the "upper shoulder" and the layer 219 just below is the "lower shoulder". Disposed within wellbore 212 is a tool 216 having a single transmitter-receiver (TR) pair of antennas, both antennas being tilted relative to the tool axis 218 of tool 216. Tool 216 may also carry the associated electronics and circuitry (not shown) necessary to operate the tool 216, but the disclosure is not limited to such. When energized, transmitter 220 transmits EM energy into the surrounding strata 214, which induces a current 222 (eddy current) in the strata 214 around transmitter 220. Eddy current 222 induces a voltage in receiver antenna 224. The angle $\phi_B$ between the tool axis 218 (which is substantially the same as the borehole axis) and the normal to the plane of a particular stratum such as stratum 215 is referred to as the relative dip of the formation or the bedding orientation angle.

Figure 3:
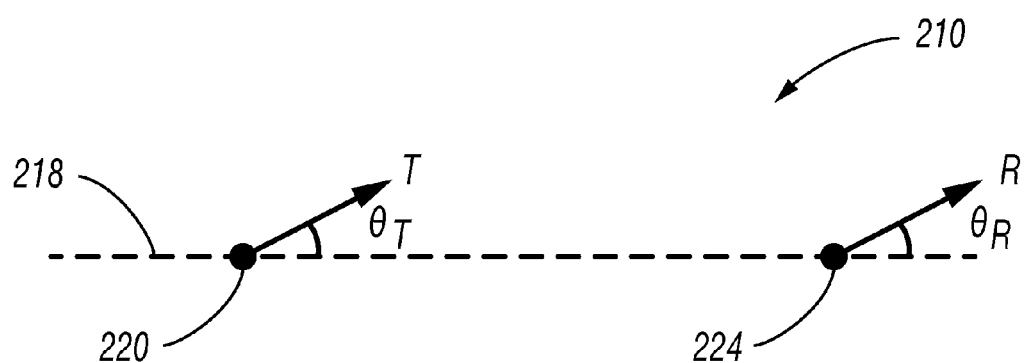
FIG. 3 illustrates a schematic of a particular configuration of a single transmitter-receiver pair, according to an example embodiment.

Certain implementations of the present disclosure described herein use the symmetrized and anti-symmetrized responses obtained from a single TR pair to provide directional measurements and anisotropy information. FIG. 3 illustrates a schematic of a particular configuration of a single transmitter-receiver pair, according to an example embodiment. In the figure, tool axis 218 is illustrated by a dashed line in side view and a dot in end view. Configuration 210 includes a tilted transmitter 220 and a tilted receiver 224, meaning the magnetic dipole moments of transmitter 220 and receiver 224 are neither parallel nor perpendicular to tool axis 218. Transmitter 220 and receiver 224 may be approximated as point magnetic dipoles. According to the present disclosure, the magnetic dipole moments of transmitter 220 and receiver 224 may be, but are not required to be in the same plane, and in some embodiments it is desired that the magnetic dipole moments of transmitter 220 and receiver 224 be in two non-parallel planes, such as in two orthogonal planes.

As can be appreciated, since the transmitter 220 and the receiver 224 are tilted, the dipole moments of the transmitter 220 and receiver 224 can be said as having an oblique dipole moment axis (oblique being understood to mean neither parallel nor perpendicular to the tool axis, e.g., 218). Accordingly, transmitter 220 may generate an electromagnetic field having a magnetic dipole moment axis that is oblique with respect to the tool axis 218. Similarly, measurements obtained by the titled receiver 224 can be referred to as oblique dipole axis measurements. Transmitters and receivers that are oriented axially (parallel to the tool axis) may have parallel dipole moment axes.

Figure 4:
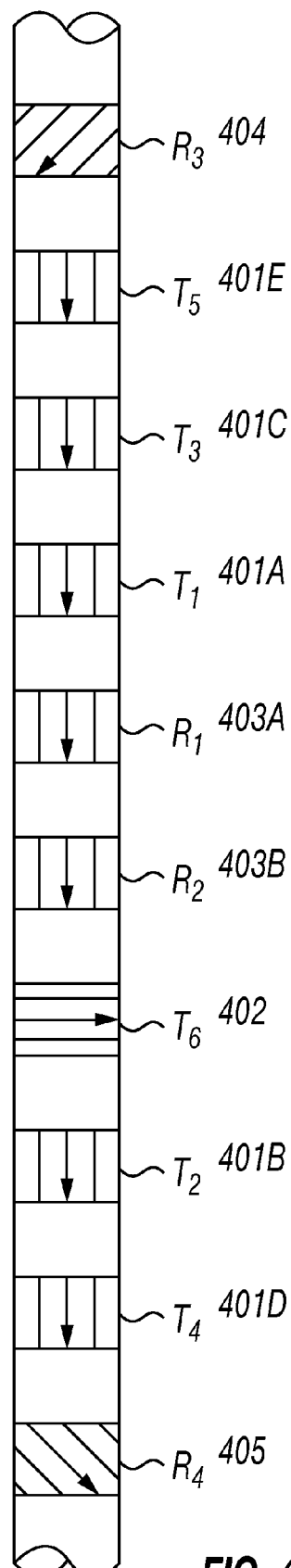
FIG. 4 depicts a directional deep-reading logging-while-drilling drilling tool, as part of the LWD tool or tools 120 in FIG. 1, according to an example embodiment.

FIG. 4 depicts a directional deep-reading logging-while-drilling drilling tool, as part of the LWD tool or tools 120 in FIG. 1. Signals from tools having axially aligned cylindrically symmetrical transmitter and receiver coils are not directionally sensitive. The tool of FIG. 4 provides tilted and transverse transmitter and receiver coils to obtain directionally sensitive measurements. The tool may include six transmitter antennas and four receiver antennas. Five transmitter antennas ($T_1$ through $T_5$) 401A-E are arranged axially along the length of the tool. A sixth transmitter antenna ($T_6$) 402 is oriented transversely to the tool axis. A receiver antenna, shown at 404, 405 is positioned at each end of the tool. This pair of receiver antennas ($R_3$ and $R_4$) 404, 405 brackets the transmitters, and each of these receivers is tilted so that its dipole moment is oriented 45 degrees to the tool axis (e.g., oblique with respect to the tool axis). An additional pair of receiver antennas ($R_1$ and $R_2$) 403A-B, located in the center of the coil array, is arranged axially (i.e., their dipole moments are substantially parallel to the axis of the tool) and can obtain conventional type propagation resistivity measurements. The described arrangement produces a preferential sensitivity to conductivity on one side of the tool. As the tool rotates, its sensors can detect nearby conductive zones and register the direction from which maximum conductivity can be measured. Magnetometers and accelerometers can provide gravitational (i.e., relative to vertical) and geomagnetic reference directional orientation data for the tool for determining direction of maximum conductivity. In addition to its directional capability, the tool provides relatively deeper measurements than most conventional LWD resistivity tools. In some embodiments, tool string containing such a resistivity tool configured as shown in FIG. 4 may also provide substantially real time bidirectional drill string telemetry which, when used in conjunction with the capabilities of the directional resistivity logging tool, as described, may improve performance of geosteering by increasing the amount of data at the surface and thus increasing the possible speed and precision of directional drilling control.

Although the discussion herein is focused on EM propagation tool measurements, it should be understood that such techniques may also apply to induction tool measurements as well. Example mathematical theories underlying the disclosure are now presented and described below with reference to FIG. 5.

In some embodiments, the disclosure provides example processing methods to determine the values of (Rh, Rv, θ) in sequence from different groups of measurements. In example embodiments, the values of Rh can be determined using the conventional propagation resistivity tool measurements, assuming an isotropic formation. This is because in low angle wells (or where the well inclination is such that the well intersects the formations approximately perpendicularly), the conventional propagation resistivity tool measurements are largely sensitive to the horizontal resistivities. The value of Rh can then be fixed, and from that and the directional resistivity measurements, Rv and θ can be determined.

Figure 5:
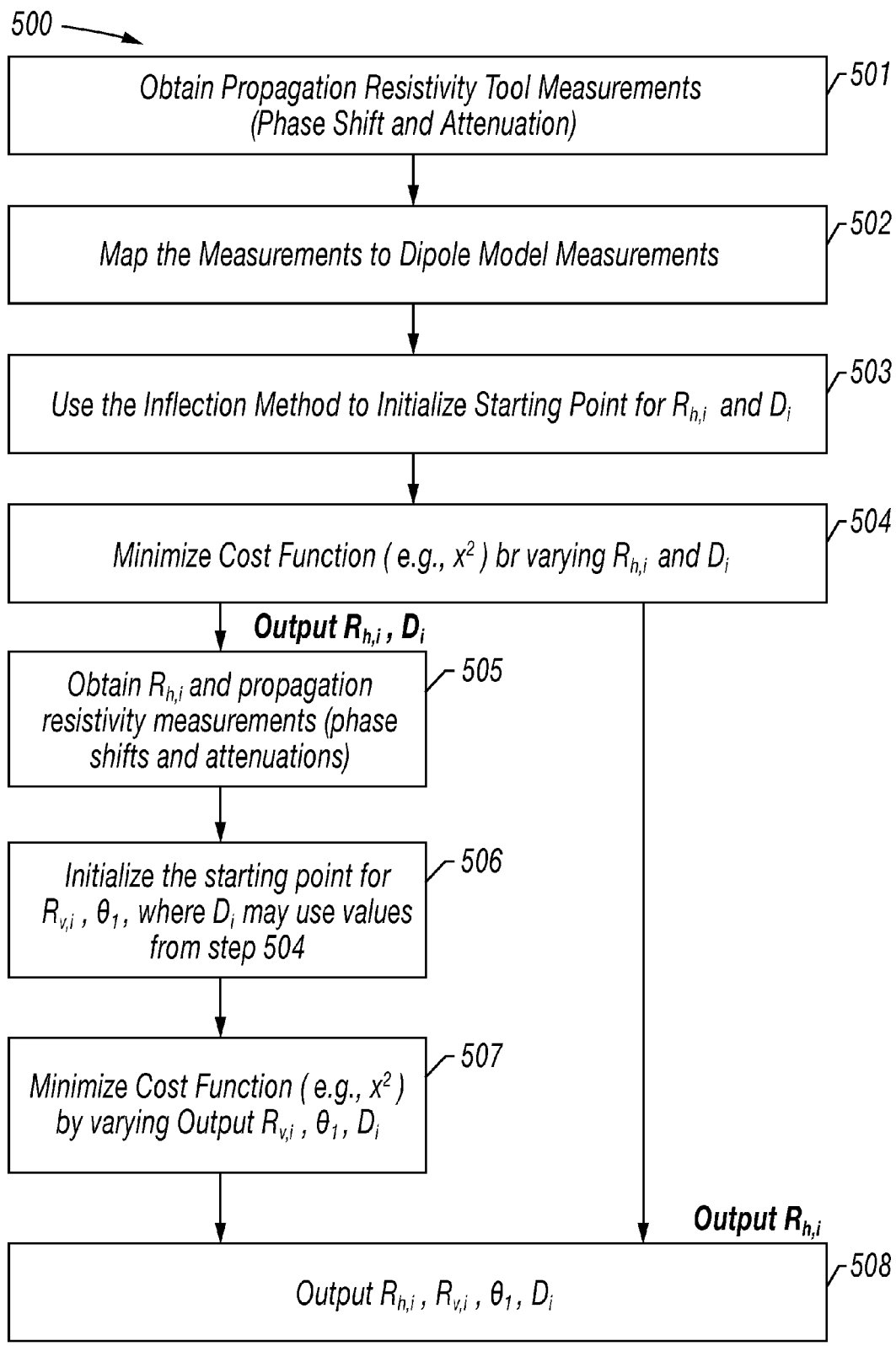
FIG. 5 illustrates a flow chart depicting a method for determining values of Rh, Rv, and θ, according to an example embodiment.

FIG. 5 is a flow chart showing an example method 500 for determining values of Rh, Rv, and θ. At step 501, the method starts with conventional propagation resistivity tool measurements, which may include phase shift and attenuation measurements from different transmitter to receiver spacings and at different transmitter frequencies. Example tools for making such measurements can include a tool sold under the trademark ARC or ARCVISION, which are trademarks of Schlumberger Technology Corporation, Sugar Land, Tex. Referring to FIG. 4 as an example embodiment, measurements acquired at step 501 may include measurements acquired using both the axial receivers R1, R2 (403A, 403B) (parallel dipole axis measurements) and measurements acquired using tilted receivers R3 (404) and R4 (405) (oblique dipole axis measurements).

At step 502, the measured phase shift and attenuations are mapped to the measurements with dipole approximations. This element of the example method can be desirable since in the inversion part to be explained below (minimizing the cost function), forward modeling code is based on a dipole model. The mapping is to convert a non-dipole antenna measurement into an equivalent dipole antenna response. In one particular embodiment, this step may contains the follow sub-steps:

(1) For a given homogeneous formation with resistivity Rt, compute the response for the actual tool, which may include non-dipole antennas.

(2) For the same formation Rt, compute the response for a dipole antenna, which is a simplification of the actual tool.

(3) For any given formation with resistivity Rt, there will then be a response for a non-dipole antenna tool and a dipole antenna tool. One may build a table for all possible values of Rt, which links the dipole and non-dipole responses.

(4) Take the raw measurement from the tool (e.g., as shown in FIG. 4) and find the corresponding Rt according to the table. For the same Rt, one can find its dipole tool response from the table. For any raw measurement (non-dipole), one can then find a corresponding dipole response from the above described procedure.

In one embodiment, this dipole mapping process is performed on parallel dipole axis measurements (e.g., using axial transmitters and receivers R1, R2 of the example in FIG. 4), but necessarily not on the oblique dipole axis measurements (e.g., using tilted receivers R3, R4 of the example in FIG. 4). In such an embodiment, oblique dipole axis measurements, which may be used to determine vertical resistivity beginning at step 505 of process 500, discussed in more detail below.

At step 503, a layered structure formation model is assumed, with $Rh_{h,i}$ ($1 \le i \le N$) and $D_i$ ($1 \le i \le N-1$) being the horizontal resistivity and the location of the bottom boundary of the i-th layer, respectively, and N being the number of the layers. In some embodiments, particularly where low angle wells are being considered, the measurements can have no or very little sensitivity to the vertical resistivity and the relative dip angle. In this element of the method one can then use an inflection algorithm to square log one of the resistivity curves, such as the phase shift resistivity at 22' spacing and 2 MHz frequency, and use the resistivity values and boundary locations from the square log as an initial starting point for the parameters $R_{h,i}$ ($1 \le i \le N$) and $D_i$ ($1 \le i \le N-1$).

At step 504, a cost function of $\chi^2$ type can be constructed. In one embodiment, the cost function may be the sum of the square of the differences between the measured data and forward modeled data, weighted by the inverse of the uncertainty. In some embodiments, the method can then minimize the cost function using any known optimization algorithm, such as the Gauss-Newton method, to find the best-fit model. The minimized cost function can then yield an output of the values of $R_{h,i}$ ($1 \le i \le N$) and $D_i$ ($1 \le i \le N-1$) from the best-fit model. Thus, to summarize, in steps 501-504, horizontal resistivity of a formation is determined using parallel dipole axis measurements (e.g., those obtained by receivers with magnetic dipoles having an axis parallel to the tool axis—such as receivers R1, R2 of FIG. 4).

At step 505, the phase shift and attenuation measurements from the directional resistivity measurements can be obtained, as well as the horizontal resistivity and boundary layer locations calculated at step 504. As stated above, the measurements obtained at step 505 may include oblique dipole axis measurements, such as those acquired via the tilted antennas R3, R4 in the FIG. 4 example. It should be understood that these oblique dipole axis measurements could be obtained at step 501, as noted above, but not expressly used in the inversion described herein until step 505.

At step 506, a layered structure formation model is assumed. However, because the measurements are from directional resistivity tools, which are sensitive to both horizontal resistivities, vertical resistivities, and to relative dip angles, the formation model can be parameterized by $R_{h,i}$ (1<i<N), $R_{v,i}$ (1<i<N), and $D_i$ (1<i<N−1) and $\theta$. In some embodiments, the method can assume all the layers are parallel. Accordingly, in some embodiments, there may be only one relative dip angle $\theta$. The values of $R_{h,i}$ (1<i<N) obtained at step 504 can be fixed, and the method can then initialize the starting values for $R_{v,i}$ (1<i<N), and $D_i$ (1<i<N−1) and $\theta$, using initial values of $D_i$, as obtained at step 504.

At step 507, a cost function of $\chi^2$ type can be constructed, with some or all of the measurements obtained by the directional resistivity tool. The cost function can then be minimized with any known optimization algorithm such as the Gauss-Newton method to find the best-fit model. This minimized cost function can then yield an output of the values of $R_{v,i}$ (1<i<N), and $D_i$ (1<i<N−1) and $\theta$ from the best-fit model. Thus, to summarize, in steps 505-507, vertical resistivity ($R_{v,i}$), formation boundary layers ($D_i$), and dip angle ($\theta$) of a formation is determined using oblique dipole axis measurements (e.g., those obtained by receivers with magnetic dipoles having an axis that is tilted with respect to the tool axis—such as receivers R3, R4 of FIG. 4).

Thereafter, as shown at step 508, the inverted values of $R_{h,i}$ (1<i<N) from step 504 can be combined with $R_{v,i}$ (1<i<N), and $D_i$ (1<i<N−1) and $\theta$ from step 507 as the final outputs of the method 500. Essentially, the above-described method 500 provides for determining horizontal resistivity of a formation based on parallel dipole axis measurements (e.g., parallel with respect to the tool axis) and determining vertical resistivities, formation layer boundaries, and/or dip angle based on oblique dipole axis measurements (e.g., oblique understood to mean neither parallel nor perpendicular to the tool axis).

The example methods and steps described in the embodiments presented previously are illustrative, and, in other embodiments, certain acts can be performed in a different order, in parallel with one another, omitted entirely, and/or combined between different example methods, and/or certain additional steps can be performed, without departing from the scope and spirit of the disclosure. Accordingly, such other embodiments are included in the scope of the invention described herein.

The methods of the present disclosure can include a computer program that embodies the functions described herein and illustrated in the appended flow charts. However, it should be apparent that there could be many different ways of implementing the methods of the disclosure in computer programming, and the methods of the disclosure should not be construed as limited to any one set of computer program instructions. Further, a skilled programmer would be able to write such a computer program to implement an embodiment of the disclosed methods based on the flow charts and associated description in the application text. Therefore, disclosure of a particular set of program code instructions is not considered necessary for an adequate understanding of how to make and use the systems and methods of the disclosure.

Figure 6:
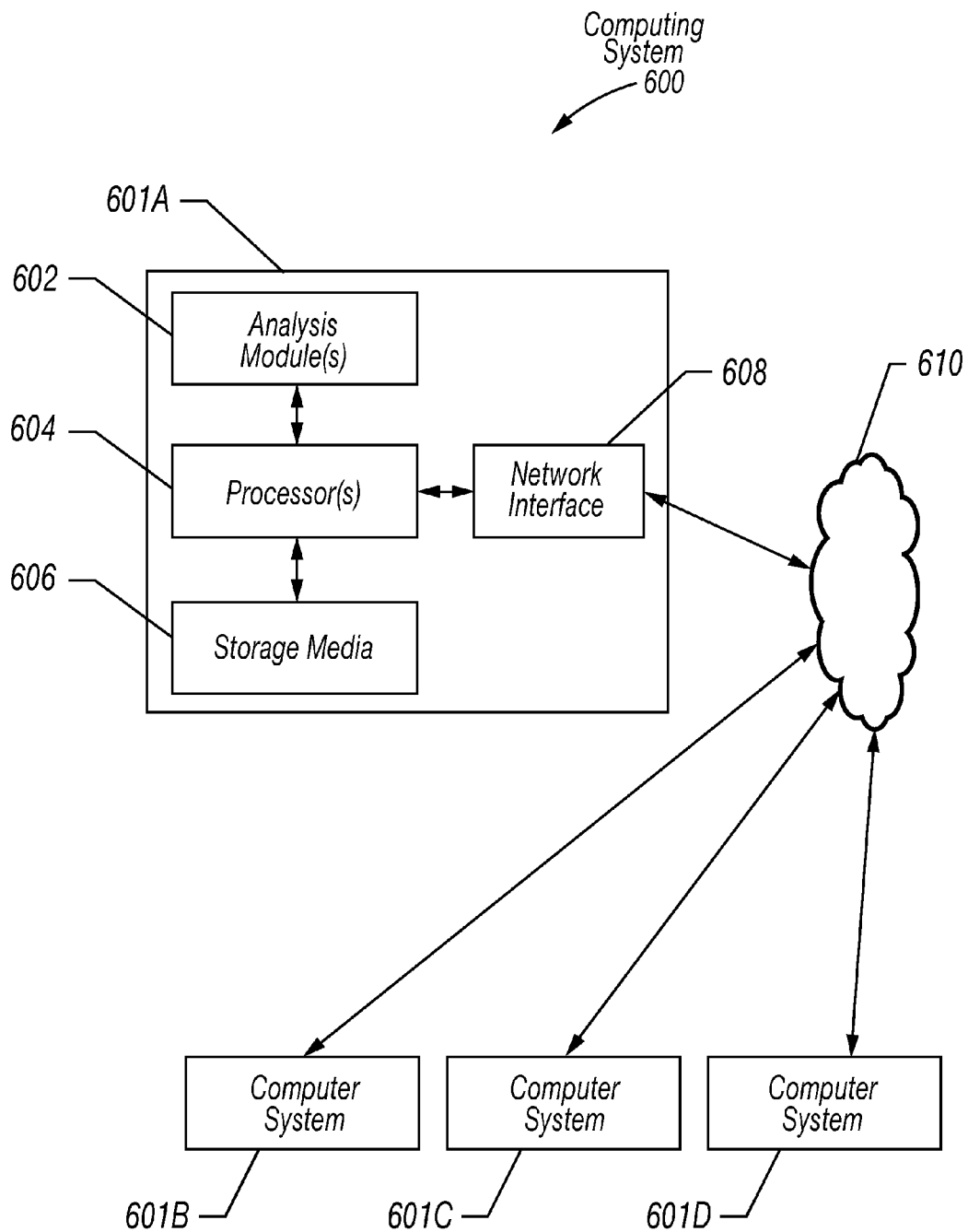
FIG. 6 shows an example computer system that may be used to implement signal processing that, for example, carries out the method depicted in FIG. 5, according to some embodiments.

FIG. 6 depicts an example computing system 600 in accordance with some embodiments. The computing system 600 may be an individual computer system 601A or an arrangement of distributed computer systems. The computer system 601A may include one or more analysis modules 602 that may be configured to perform various tasks according to some embodiments, such as the tasks depicted in FIG. 6. To perform these various tasks, analysis module 602 may execute independently, or in coordination with, one or more processors 604, which may be connected to one or more storage media 606. The processor(s) 604 may also be connected to a network interface 608 to allow the computer system 601A to communicate over a data network 610 with one or more additional computer systems and/or computing systems, such as 601B, 601C, and/or 601D (note that computer systems 601B, 601C and/or 601D may or may not share the same architecture as computer system 601A, and may be located in different physical locations, for example, computer systems 601A and 601B may be on a ship underway on the ocean or on a well drilling location, while in communication with one or more computer systems such as 601C and/or 601D that may be located in one or more data centers on shore, aboard ships, and/or located in varying countries on different continents).

A processor can include a microprocessor, microcontroller, processor module or subsystem, programmable integrated circuit, programmable gate array, application-specific integrated circuit (ASIC), a system-on-a-chip (SoC) processor, or another suitable type of control or computing device.

The storage media 606 can be implemented as one or more computer-readable or machine-readable storage media. Note that while in the example embodiment of FIG. 6 the storage media 606 are depicted as being within computer system 601A, in some embodiments, the storage media 606 may be distributed within and/or across multiple internal and/or external enclosures of computing system 601A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described above (e.g., in FIG. 4) may be implemented by running one or more functional modules in information processing apparatus such as general purpose processors or application specific chips, such as ASICs, FPGAs, SoCs, PLDs, or other appropriate devices. These modules, combinations of these modules, and/or their combination with general hardware are all included within the scope of the present disclosure.

Although specific embodiments of the disclosure have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A method for logging subsurface formations penetrated by a wellbore comprising:
    measuring electromagnetic properties of the formations using electromagnetic fields having a magnetic dipole axis parallel to a logging tool axis;
    measuring electromagnetic properties of the formations using electromagnetic fields having a magnetic dipole axis oblique to the logging tool axis;
    mapping a measured phase shift and attenuations to the properties of the formations with dipole approximations to convert non-dipole antenna measurements into an equivalent dipole antenna response;
    determining a horizontal resistivity of the formations from the parallel dipole axis measurements using a layered structure formation model; and
    determining a vertical resistivity, formation layer boundaries and a dip angle of the formations from the oblique dipole axis measurements.

2. The method of claim 1, wherein the formation layer boundaries and horizontal resistivities from the parallel dipole axis measurements are used as initial values for an inversion procedure to determine vertical resistivity and dip angle using the oblique dipole axis measurements.

3. The method of claim 1, wherein the parallel dipole axis measurements and/or the oblique axis measurements comprise electromagnetic induction measurements.

4. The method of claim 3, wherein the measurements are made at a plurality of transmitter to receiver spacings.

5. The method of claim 3, wherein the measurements are made at a plurality of frequencies.

6. The method of claim 1, wherein the parallel dipole axis measurements and/or the oblique dipole axis measurements comprise electromagnetic propagation measurements.

7. The method of claim 6, wherein the measurements are made at a plurality of transmitter to receiver spacings.

8. The method of claim 6, wherein the measurements are made at a plurality of frequencies.

9. The method of claim 1, wherein determining the horizontal resistivity of the formation comprises:
    mapping the parallel dipole axis measurements to a dipole model;
    determining an initial starting point for horizontal resistivity and bed boundary locations; and
    minimizing a cost function by varying horizontal resistivity and bed boundary locations.

10. The method of claim 1, wherein determining the vertical resistivity of the formation comprises:
    determining an initial starting point for vertical resistivity, dip angle, and bed boundary locations from the oblique dipole axis measurements; and
    minimizing a cost function by varying vertical resistivity, dip angle, and bed boundary locations.

11. The method of claim 10, wherein an initial value of horizontal resistitivity and positions of formation layer boundaries are determined from the parallel dipole axis measurements.

12. A method for determining horizontal resistivity, vertical resistivity and formation dip of subsurface formations from electromagnetic measurements of subsurface formations, comprising:
    accepting as input to a computer measurements of electromagnetic properties of the subsurface formations made using electromagnetic dipole measurements having magnetic dipole axis substantially parallel to a well logging tool axis;
    accepting as input to the computer measurements of electromagnetic properties of the subsurface formations made using electromagnetic dipole measurements having magnetic dipole axis oblique to the well logging tool axis;
    mapping a measured phase shift and attenuations to the properties of the formations with dipole approximations to convert non-dipole antenna measurements into an equivalent dipole antenna response;
    in the computer, determining a horizontal resistivity from the parallel dipole axis measurements using a layered structure model; and
    in the computer, determining a vertical resistivity and formation dip angle from the oblique dipole axis measurements.

13. The method of claim 12, wherein the horizontal resistivities from the parallel dipole axis measurement are used as initial values for an inversion procedure to determine vertical resistivity and dip angle using the oblique dipole axis measurements.

14. The method of claim 12, wherein the parallel dipole axis measurements and/or the oblique dipole axis measurements are made at a plurality of transmitter to receiver spacings.

15. The method of claim 12, wherein the parallel dipole axis measurements and/or the oblique dipole axis measurements are made at a plurality of frequencies.

16. The method of claim 12, wherein the parallel dipole axis measurements and/or the oblique dipole axis measurements comprise either electromagnetic propagation measurements or electromagnetic induction measurements.

17. The method of claim 12, wherein determining the horizontal resistivity of the formation comprises:
    mapping the parallel dipole axis measurements to a dipole model;
    determining an initial starting point for horizontal resistivity and distance; and minimizing a cost function by varying horizontal resistivity and distance.

18. The method of claim 12, wherein determining the vertical resistivity of the formation comprises:
   determining an initial starting point for vertical resistivity, dip angle, and distance from the oblique dipole axis measurements; and
   minimizing a cost function by varying vertical resistivity, dip angle, and distance.

19. The method of claim 12, wherein an initial value of horizontal resistitivity and positions of formation layer boundaries are determined from the parallel dipole axis measurements.

* * * * *